United States Patent [19]
Hoffmann

[11] Patent Number: 5,205,617
[45] Date of Patent: Apr. 27, 1993

[54] HUB CAP

[76] Inventor: Daniel Hoffmann, 2020 Lovewood Dr., Wisconsin Rapids, Wis. 54494

[21] Appl. No.: 432,239

[22] Filed: Nov. 6, 1989

[51] Int. Cl.⁵ ............................................. B60B 7/00
[52] U.S. Cl. ............................ 301/108.1; 301/108.4; 210/542
[58] Field of Search ............ 301/108 R, 108 A, 108 S, 301/108 SC, 108 TW; 210/251, 541, 542

[56] References Cited

U.S. PATENT DOCUMENTS

| | | | |
|---|---|---|---|
| 629,563 | 7/1899 | Holcomb | 210/542 |
| 1,254,523 | 1/1918 | Miller | 210/542 X |
| 2,617,698 | 11/1952 | Gaines | 301/108 R |
| 2,854,287 | 9/1958 | Stephens | 301/108 R |
| 3,089,738 | 5/1963 | Steiner | 308/187 |
| 3,114,579 | 12/1963 | Isenbarger | 301/108 R |
| 3,316,022 | 4/1967 | Isenbarger | 301/108 TW X |
| 3,331,638 | 7/1967 | Fruth | 301/108 TW |
| 3,395,950 | 8/1968 | Brandt | 308/36.2 |
| 3,649,080 | 3/1972 | Molinare | 301/108 R |
| 4,834,464 | 5/1989 | Frehse | 301/108 R |

Primary Examiner—Russell D. Stormer
Attorney, Agent, or Firm—Thomas D. Wilhelm

[57] ABSTRACT

A hub cap for an oil-lubricated wheel hub. Wall positioning and internal elements of the hub cap encourage improved lubrication of the outer wheel bearing. Also taught are filter media and magnets, secured in the hub cap, for holding sediment particles and metal carried by the oil.

31 Claims, 4 Drawing Sheets

HUB CAP

BACKGROUND OF THE INVENTION

This invention relates to a hub cap for use on oil-lubricated wheel and axle assemblies of vehicles. Wheel and axle assemblies used on large trailers and truck tractors involve the rotatable mounting of a wheel, by means of a wheel hub, on a fixed axle. The wheel hub, along with oil seals at the inner bearing, defines a first part of a lubricant reservoir. Oil in the lubricant reservoir lubricates the bearing which facilitate the rotation of the wheel about the axle. The hub cap used with such an oil-lubricated wheel and axle assembly comprises a second integral part of the lubricant reservoir.

Conventional hub caps known for use with oil-lubricated wheel and axle assemblies are taught, for example, in the following United States patents.

Stephens U.S. Pat. No. 2,854,287
Steiner U.S. Pat. No. 3,089,738
Isenbarger U.S. Pat. No. 3,114,579
Isenbarger U.S. Pat. No. 3,316,022
Fruth U.S. Pat. No. 3,331,638
Brandt U.S. Pat. No. 3,395,950

It is known that the subject oil reservoirs have a tendency to leak. And so conventional hub caps have a transparent outer wall whereby the level of the oil on the interior of the reservoir can be visually inspected. If the oil level is found to be low, oil is added through a filler plug commonly provided. But sometimes a low oil level is not detected.

Especially on large vehicles, such as semi-tractors and trailers, the outer wheel bearing is smaller, and rides at a higher level than the inner wheel bearing. This relationship is seen in Stephens U.S. Pat. No. 2,854,287 where the bottom of his outer bearing 14 is disposed upwardly from the bottom of his inner bearing 15.

As the oil leaks, and the oil level recedes, the oil level drops below the bottom of the outer bearing in such reservoirs, and the outer bearing runs dry while the inner bearing is still effectively lubricated. Within a short time, the outer bearing fails because of lack of lubrication, whereupon the vehicle is effectively stopped, and out of service until the bearing is replaced.

Isenbarger U.S. Pat. No. 3,316,022 is typical of the most common hub caps which contain no oil when the oil level in the hub drops below the bottom of the smaller outer bearing. Fruth U.S. Pat. No. 3,331,638 teaches baffles for moving the oil. Miniature reservoirs between baffles of Fruth extend to an imaginary circle of lesser diameter than the center-line of the hub cap mounting holes. As indicated by study of Fruth's FIG. 1, when the oil level drops below the outer bearing, there is little oil in his hub cap.

It is an object of this invention to provide an improved hub cap which assists in sustaining the lubrication of especially the outer bearing at low oil levels.

It is another object of the invention to provide a hub cap having an expanded reservoir adapted to retain oil and apply the oil to the outer bearing when the oil level is low.

Yet another object of the invention is to provide a hub cap which defines a secondary oil reservoir when the oil level is below the peripheral center-line of the securing locus.

It is still another object to provide a hub cap having pumping baffles adapted to urging oil toward the outer bearing.

It is yet another object to provide a hub cap having filter means to trap and hold sediments in the oil.

It is a further object to provide a hub cap having magnet means to attract and hold magnetic particles and fragments in the oil.

SUMMARY OF THE DISCLOSURE

Certain of the objectives are obtained in a hub cap for an oil-lubricated wheel hub, wherein the hub cap comprises a securing locus for securing the hub cap to the wheel hub, the securing locus defining an annulus, and having a peripheral center-line thereof extending about the annulus, wherein walls of the hub cap define an inner space having a length along a longitudinal axis thereof, and wherein an outer boundary of the inner space is defined in a plane perpendicular to the longitudinal axis. Portions of the outer boundary of the space extend outwardly of the peripheral center-line of the securing locus.

In preferred embodiments, the walls include an inner wall adapted to face the hub, an outer wall disposed away from the hub, and a peripheral connecting wall between the inner and outer walls, at least a portion of the securing locus being disposed on the inner wall, inwardly of the outer boundary of the inner space, and toward the longitudinal axis.

A preferred structure for the securing locus comprises a plurality of closed bolt channels, extending through the inner space; the interiors of the closed bolt channels communicating with corresponding holes on the inner and outer surfaces, but not communicating with the inner space. The hub cap is preferably secured to the wheel hub by a plurality of bolts, which secure the hub cap to the hub with an oil-tight securement. The oil-tight securement can include a gasket, a seal ring, or the like between the hub and the surface of the hub cap facing the hub.

It is preferred that at least the outer wall, the connecting wall, and the bolt channels comprise a plastic composition, such as a transparent plastic which facilitates seeing the level of the oil contained in the hub-cap when it is on the vehicle. Most preferably, all structural elements are plastic.

Preferably the hub cap includes a plurality of baffles spaced circumferentially about the outer boundary of the inner space. The baffles define average angles, between the inner and outer walls, of at least about 5° with respect to a plane which passes through the longitudinal axis, and the connecting wall adjacent the respective one of the baffles.

With the hub cap mounted on a vehicle, when one such angle is defined with the angle apex at the inner wall, that angle is preferably disposed in the direction of rotation of the hub cap upon forward movement of the vehicle.

Some embodiments of the hub cap include baffles defining opposing angles with respect to a plane passing through the longitudinal axis and the connecting wall. These baffles are adapted to urging oil toward the inner wall upon rotation of the hub cap in either direction about the longitudinal axis.

Other objects of the invention are attained in a hub cap comprising a plurality of walls defining an inner space, and including filter means secured in the inner space and adapted to trap sediments carried by the oil.

Still other objects are attained in a hub cap comprising a plurality of walls defining an inner space, and including magnet means secured in the inner space, and adapted to attract and hold metal particles and fragments carried by the oil.

Desirably both the filter means and the magnet means are used, in combination, whereby metal particles can be trapped by either the magnet or the filter, and other particles and sediments can be trapped by the filter media.

DETAILED DESCRIPTION OF THE ILLUSTRATED EMBODIMENTS

Figure 1:
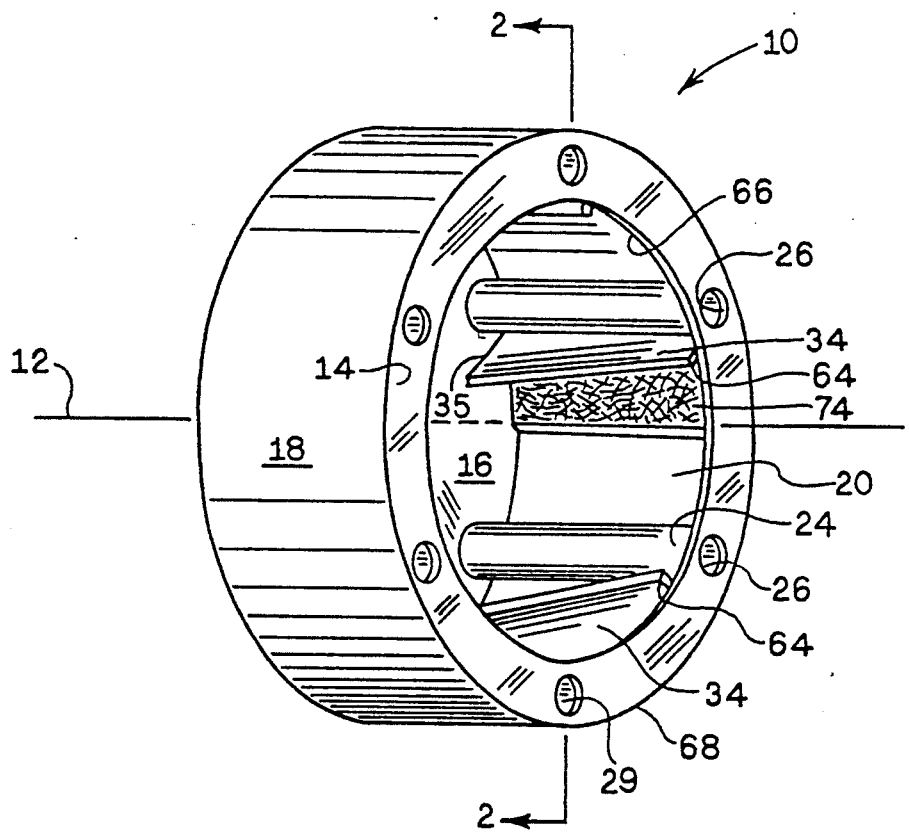
FIG. 1 is a perspective view of a hub cap of the invention.

Referring to FIG. 1, a hub cap 10 has a longitudinal axis 12. An inner wall 14 extends about the perimeter of hub cap 10. Outer wall 16 serves as a closure on the opposite end of the hub cap. Cylindrical connecting wall 18 connects inner and outer walls 14 and 16.

The combination of inner wall 14, outer wall 16, and connecting wall 18 defines an inner space 20 between outer wall 16 and an imaginary plane extending along the inner surface of inner wall 14 and perpendicular to longitudinal axis 12. The inner space defines an outer boundary thereof 22 about the inner surface 20 of connecting wall 18 (FIG. 2).

A plurality of bolt channels 24 extend between inner and outer walls 14 and 16, and communicate with corresponding holes 26 in inner wall 14 and corresponding holes 28 (FIG. 3) in outer wall 16. The combination of holes 26 and 28, and channels 24 makes a liquid-tight closed passage 29 through inner space 20. Closed passage 29 does not communicate with inner space 20. The plurality of passages 29, along with corresponding holes 26 and 28, operate as a securing locus for securing the hub cap 10 to the hub. Accordingly, a plurality of securing bolts 30 (FIG. 7) pass through passage 29, for securing the hub cap 10 to a hub 32 at the securing locus, without leakage of oil 33 around the bolt channels 24.

Figure 2:
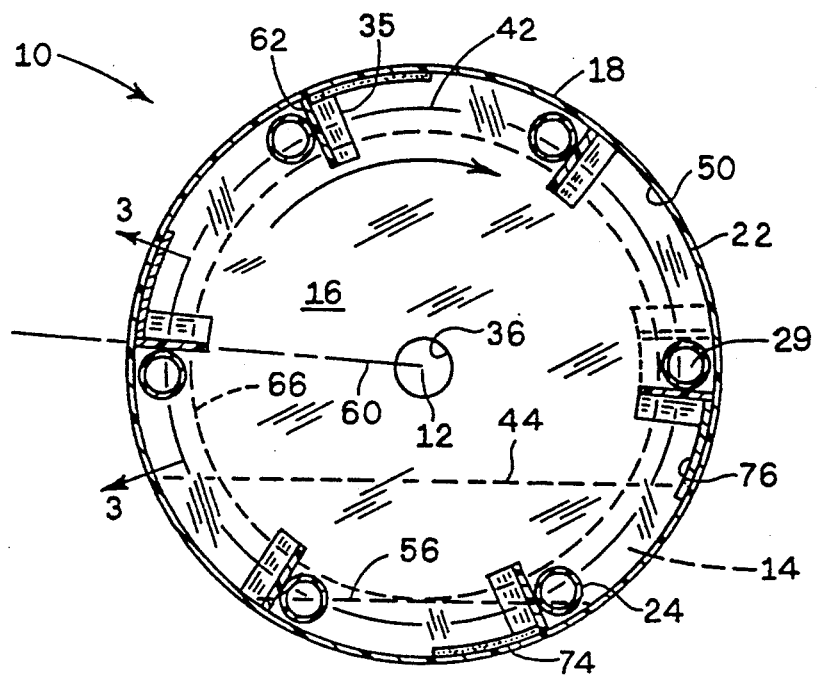
FIG. 2 is a cross-section of the hub cap, taken at 2—2 of FIG. 1.
Figure 3:
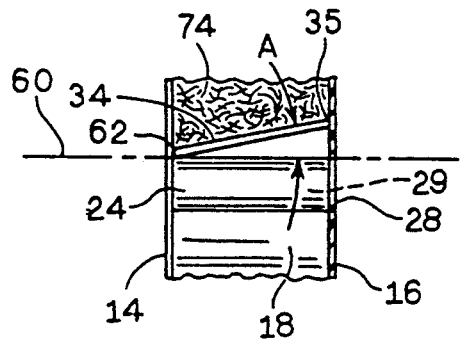
FIG. 3 is a fragmentary cross-section showing one of the baffles and one of the bolt channels, and is taken at 3—3 of FIG. 2.

Referring to FIGS. 1-3, a plurality of baffles 34 extend between inner and outer walls 14 and 16.

Outer wall 16 contains a conventional central hole 36, adapted to adding oil to the hub in the conventional manner. Hole 36 is also adapted to receive a trip odometer 40 in the conventional manner, in any of the embodiments. When hole 36 is not being otherwise used, it is closed by a plug 38.

Figure 8:
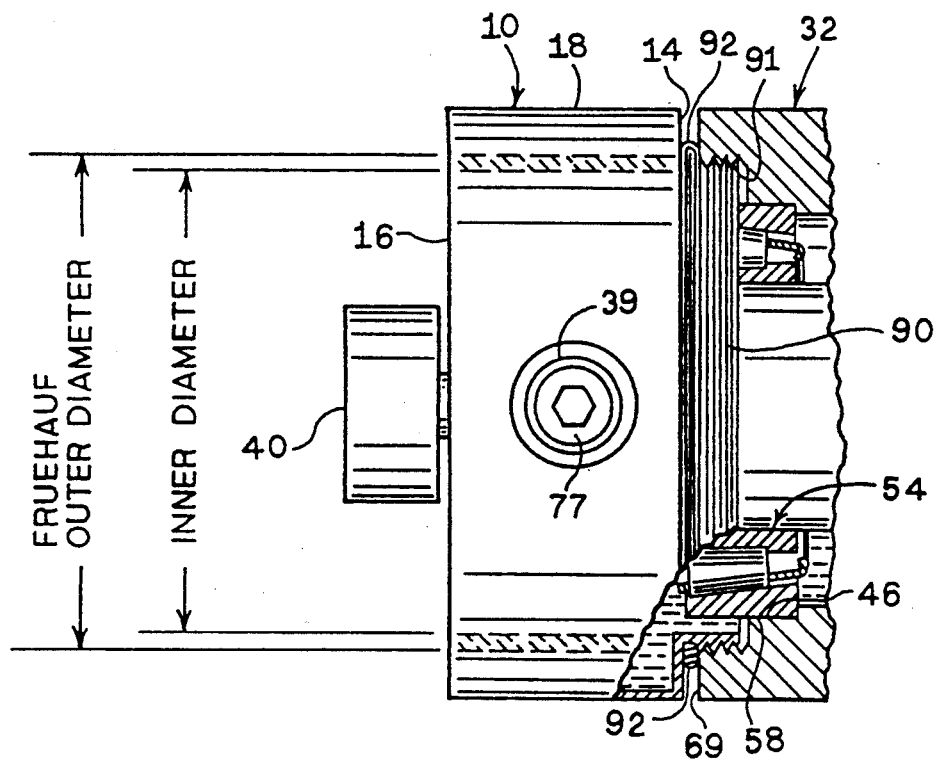
FIG. 8 shows a fragmentary assembly as in FIG. 7, and wherein the hub cap is secured to the hub by means of screw threads on the hub cap, and corresponding receptive threads on the hub.

Connecting wall 18 can include a fill hole 39 and plug, as illustrated in FIG. 8, for adding oil 33 when hole 36 is otherwise occupied, such as with a trip odometer 40.

Center line 42 extends about hub cap 10, passing through the centers of each of the passages 29, and forming a circle. Outer boundary 22 is disposed outwardly of center-line 42.

In preferred embodiments of this invention, connecting wall 18, and thus outer boundary 22 extend outwardly of the center-line 42. FIG. 2 illustrates the normal oil level at line 44 in the hub cap. Since the oil reservoir is partially defined by outer wall 16 and connecting wall 18, the oil 33 contacts essentially all of the surface of outer wall 16, except at passages 29. Is preferred that at least walls 16 and 18, and preferably the entire hub-cap, be fabricated of visually transparent plastic. Accordingly, the larger circumference hub cap of this invention (inner space extending outwardly of center-line 42) has more transparent surface area than prior art hub caps, whereby determination of oil level is facilitated. Thus the oil 33 can be seen and inspected through the transparent portions of outer wall 16.

Another advantage of the increased circumference of the hub caps of this invention is that the hub caps can contain more oil than prior art hub caps. Specifically, the hub caps of this invention provide a secondary oil reservoir between the inner surface 46 of hub 32 and the interior surface 50 of connecting wall 18 at outer boundary 22. This secondary reservoir becomes effective when the oil level drops below inner surface 46 of hub 32, such as to line 56 in FIGS. 2 and 6. When this happens, the inner bearing 52 is lubricated by the oil in hub 32, and outer bearing 54 receives lubrication from the secondary reservoir in hub 10. When the oil level is thus low, the oil in outer bearing 54 will tend to return to hub cap 10—at high speed, by centrifugal force; and at low speed, by gravity. Accordingly, the hub cap can still deliver some oil to the outer (smaller) bearing when the oil level in the hub drops below the bottom of the outer bearing.

Figure 6:
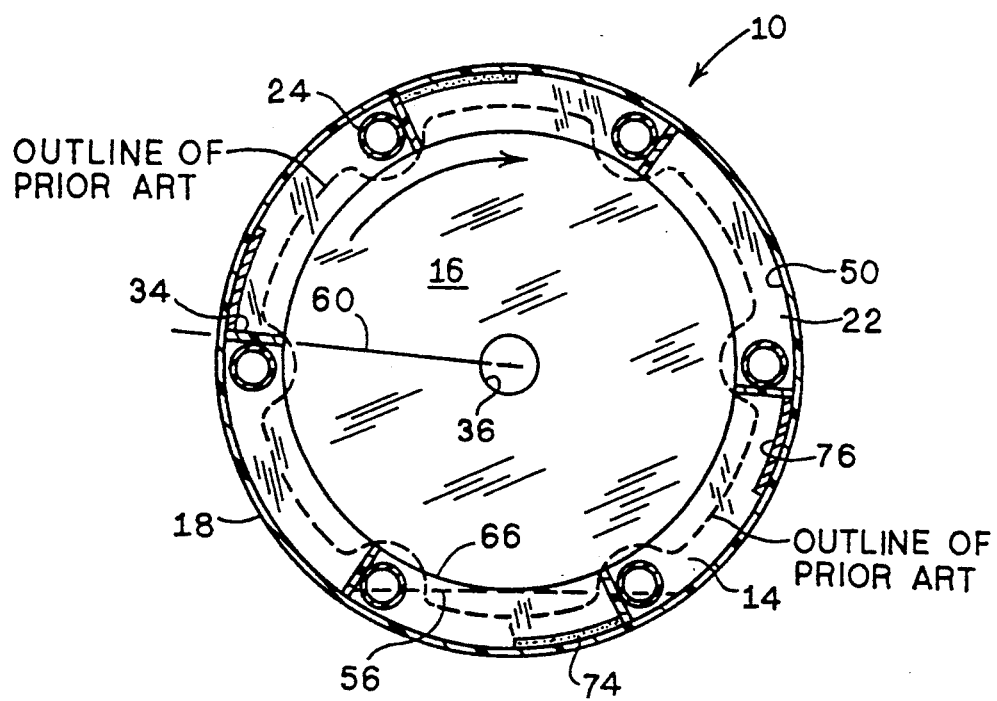
FIG. 6 shows an alternate embodiment wherein the baffles are contained in planes which essentially parallel or contain the longitudinal axis.

Referring now to FIGS. 2 and 6 herein, oil level line 56 indicates the level of oil in the hub cap when the oil level in the hub (FIG. 7) has dropped below the outer race 58 of outer bearing 54. Accordingly, when the oil level in the hub is so low that the oil in the hub is insufficient to lubricate outer bearing 54, then the oil contained in hub cap 10 will continue to be available to lubricate outer bearing 54 for a while longer, and will so lubricate it. Desirably, the low oil level will be detected in the next daily inspection of the hub cap, whereby the failure of the outer bearing 54 will have been avoided when the oil is replenished to its normal level at line 44 illustrated in FIG. 7.

It is noted that, at low oil levels, such as when there are effectively two oil reservoirs, outer bearing 54 receives only low levels of lubricant (e.g. drop-wise). At those levels of lubricant flow, outer bearing 54 is increasingly a barrier to passage of oil therethrough, whereby the oil tends to flow back to hub cap 10 and thus, to recycle onto bearing 54, rather than passing through bearing 54, and into the oil reservoir inside hub 32.

The amount of oil retained in the hub cap is significantly greater at all oil levels than in prior art hub caps. At the normal oil level of line 44, the hub caps illustrated in FIGS. 2 and 6 contain about 45% more oil, by volume, than an imaginary hub cap whose outer boundary describes a circle through center-line 42. It contains an even greater percentage advantage over the closest known prior art hub cap, whose interior boundary is shown in dashed outline in FIG. 6, superimposed on the hub cap of this invention. As the oil level drops below the outer race 58 of the outer bearing, the hub caps of the invention continue to contain an amount of oil effective to continue lubricating outer bearing 48. Even when the oil level drops below the center-line of the bolt holes, wherein, by definition all hub caps of the prior art would be empty, the hub caps herein still contain some oil, whereby they continue to provide some lubrication to outer bearing 48.

Figure 3A:
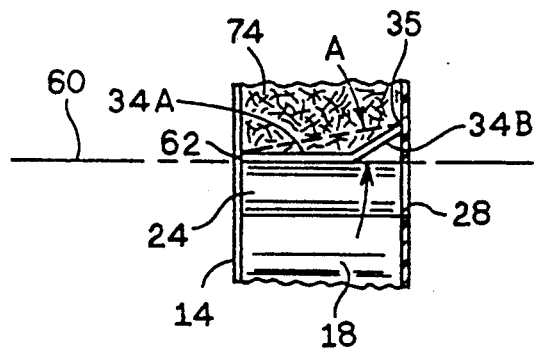
FIG. 3A is a fragmentary cross-section as in FIG. 3, showing an alternate baffle design.

Baffles 34 are preferably, but not necessarily, adjacent bolt channels 24. Baffles 34 preferably define average angles "A", measured, as shown, between inner and outer walls 14 and 16, of at least 5°, preferably at least 10°. One side of the angle "A" is defined by a baffle 34. The other side of angle "A" is defined by a plane 60 containing axis 12, and passing through connecting wall 18 at the trailing edge 62 of baffles 34. FIGS. 1-3 illustrate baffles 34, having leading edges 35, as being contained in a single plane. FIG. 3A illustrates a baffle 34, having a leading edge 35, having components 34A and 34B which join at an angle. Baffles 34 can have a variety of shapes, designed to pump the oil as the hub cap turns with the wheel. Baffles 34 can have curved surfaces, not shown, formed according to known designs for impeller blades of pumps for pumping liquids having flow properties like that of the oil used in such hub caps. The specifications and properties of such oils are well known to those skilled in the art of oil-lubricated wheel hubs.

A significant feature of the preferred hub caps of this invention is in the design and placement of baffles 34, and their corresponding operation. FIG. 6 illustrates an embodiment wherein baffles 34 generally parallel longitudinal axis 12. FIG. 3A illustrates a baffle 34 wherein the angled portion 34B urges the oil toward inner wall 14. In FIGS. 1-3, the entire baffle 34 describes the angle "A", whereby the entire baffle urges the oil toward inner wall 14, to provide a more aggressive pumping action.

FIGS. 2 and 6 have arrows indicating the direction of rotation of the hub cap. It is seen that baffles 34 are disposed adjacent passages 29, and ahead of them in the rotation. In the embodiments of FIGS. 1-3, when the apex of angle "A" is at the inner wall 14 as in FIG. 3, then the baffle 34 defines the hypotenuse of a right triangle formed by baffle 34, plane 60, and connecting wall 18, baffle 34 being disposed in the direction of rotation of the hub cap upon forward motion of the vehicle. The angle "A" in the embodiment of FIG. 3A is similarly defined.

Figure 4:
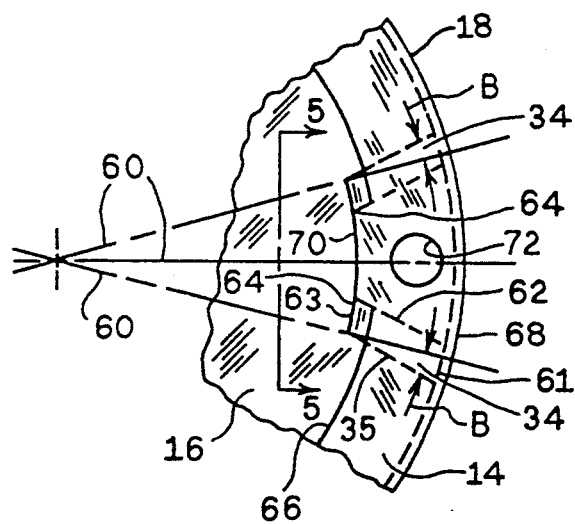
FIG. 4 is a fragmentary view of an embodiment of the hub cap having opposing baffles, and is taken looking at the surface of the hub cap which faces the hub.
Figure 5:
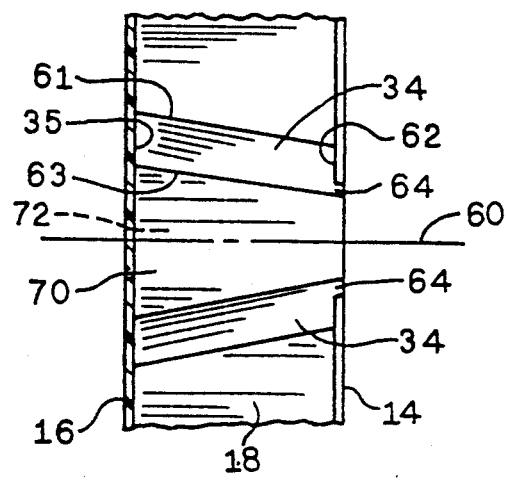
FIG. 5 is taken at 5—5 of FIG. 4, and shows a side view of the opposing baffles.

The embodiment of FIGS. 4 and 5 illustrates a baffle design including opposing baffles 34 on either side of passages 29, defining opposing angles "B" with respect to plane 60 which passes through the longitudinal axis 12 and through connecting wall 18. The opposing baffles 34 are adapted to urging oil toward inner wall 14 upon rotation of the hub cap in either direction about the longitudinal axis.

Further with respect to the embodiment of FIGS. 4 and 5, upon rotation of the hub cap in either direction, the leading edges, 35 at connecting wall 18 and 61 at outer wall 16, of the corresponding baffle 34 which is active in the given direction of rotation, lead the corresponding trailing edges 62 and 63 of the corresponding baffle. The combination of leading edges 35 and 61 urges the oil, upon rotation, toward the corner 64 of the baffle 14 which most closely approaches the inner orifice 66 of inner wall 14, and which also most closely approaches outer bearing 54. Corners 64 of baffles 34 can be further extended past inner wall 14, toward bearing 54. The specific design of the assembly inside the specific hub 32 is controlling of the locus and limits of approach of corner 64, as the baffle extends beyond inner wall 14, and orifice 66. Namely, the baffles 34 cannot interfere with the outer bearing 54 or the nut 84. It is preferred that corner 64 of a baffle 34 extend inwardly of orifice 66 when spaced permits, whereby the oil is directed around inner wall 14, close to bearing 54, and has an unimpeded path to outer bearing 54, without baffle 34 interfering with bearing 54 or nut 84.

Figure 7:
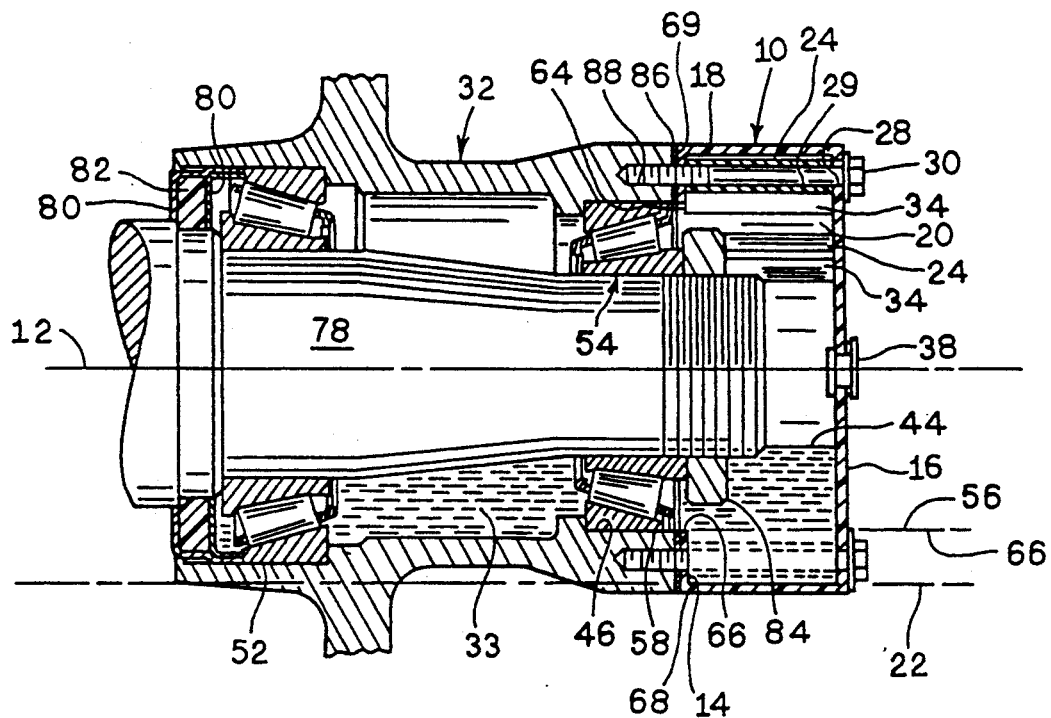
FIG. 7 shows a cross-section of an assembly of a hub cap of FIGS. 1 and 2, secured to a hub, using a plurality of bolts as securing means.

Inner wall 14 extends inwardly toward axis 12 from connecting wall 18, whereby the mounting holes 26 are disposed inwardly of connecting wall 18. The surface area of inner wall 14 generally corresponds to the mounting surface of the hub to which it is to be mounted. Namely, the outer circumference 68 of inner wall 14 generally corresponds with the outer circumference of the mounting surface 69 of hub 32, as seen in FIG. 7. The inner circumference at orifice 66 corresponds to the inner circumference of the mounting surface 69 of hub 32. Accordingly, the surface of inner wall 14 which faces hub 32, and mounts to hub 32, preferably through gasket means or seal means, generally reflects the corresponding mounting surface 69. Such relationship is shown in FIG. 7. As seen in FIG. 7, the low oil level line 56 corresponds with the lowest locus of orifice 66 and the inner circumference of the mounting surface 69 of hub 32.

In one family of preferred embodiments, illustrated in FIGS. 4 and 5, a pair of baffles 34, and an inner joining wall 70 comprise a sealed enclosure 72 extending between outer wall 16 and inner wall 14, and encompassing holes 26 and 28. Accordingly, the sealed enclosure 72 separates the bolt holes 26 and 28 from the inner space 20, such that separate bolt channels 24 are not needed so long as the structural strength of enclosure 72 is sufficient to accommodate the tightening of the bolts when the hub cap is secured to the hub. Accordingly, sealed enclosure 72 in the embodiment of FIGS. 4 and 5 takes the place of a passage 29 in the embodiment of FIGS. 1-3. Preferably, and as seen in FIGS. 4 and 5, enclosure 72 is formed integral with inner wall 14 and outer wall 16.

Filter media 74 is mounted in the inner space 20 at the interior surface 50 of connecting wall 18, for example by an adhesive. Filter media 74 traps and holds particles and sediments in the oil, thus to extend the life of the oil and of bearings 52 and 54.

Magnetic strip 76 (FIG. 2) is also mounted, such as by an adhesive, to interior surface 50, and attracts and holds metallic particles and fragments in the oil, whereby it, too, functions to clean the oil.

Alternatively, filter media 74 or magnetic strips 76, or both, can be secured in the hub cap by mechanical fasteners such as screws or brackets.

Thus the combination of filter media 74 and magnetic strips 76 combined, function to remove deleterious particles and fragments from the lubricating oil 33.

The material from which hub caps of the invention are made can be selected with some degree of freedom, so long as the performance criteria of strength of the structure and visibility of the oil are met. Preferably, the entire hub cap is made from plastic, such as an acrylic, or polycarbonate, by a conventional fabrication process such as injection molding or the like. Accessory elements which are joined to the hub cap after forming are typically metal. These include, for example, bolts 30 and the plug 77 in fill hole 39.

It is important that the user be able to visually inspect the oil level inside the hub cap. So outer wall 16 should have sufficient transparency to facilitate visual determination of the oil level, especially at low oil levels such as at low oil line 56.

An alternative to the all-plastic construction is to fabricate the hub caps from a combination of metal and glass, or metal and plastic. The metal provides structural strength to components which are stressed when the hub cap is mounted to the hub. The plastic or glass provides visual transparency for facilitating inspection of the oil level.

The hub caps of the invention are intended for use with hubs 32 as seen in FIG. 7. As seen therein, the hub 32 is mounted on an axle 78, and rotates about axle 78 on inner and outer bearings 52 and 54. An inner seal, comprising seal rings 80 and compressible seal material 82 generally seal the inner end of hub 32. Lock nut 84 secures the hub onto the axle 78 at the outer end of the hub.

The hub cap 10 is mounted and secured to the hub as seen in FIG. 7, using intervening gasket 86 as desired. In mounting and securing the hub cap, the outer surface of inner wall 14 is brought into facing relationship with the respective mounting surface 69 at the outside of hub 32. Bolts 30 are aligned with, and are engaged in, corresponding holes 88 in hub 32. The bolts 30 pass through holes 26 and 28, and passage 29; or sealed enclosure 72, or the equivalent. Bolts 30 are tightened, whereupon the hub cap has been assembled to the hub, which completes assembly of the oil reservoir comprising the hub and the hub cap. Oil is then added to the reservoir, either through central hole 36 or fill hole 39, sufficient to bring the oil up to the desired level, e.g. line 44. The plug 38, or 77, as applies, is then replaced whereupon the hub and hub cap are a sealed unit, adapted to, and capable of, lubricating bearings 52 and 54 as hub 32 turns about axle 78. The oil level in hub cap 10 is then visually inspected at regular intervals through outer wall 16, to insure that the reservoir contains a sufficient amount of oil. Preferably, each hub cap is inspected before the beginning of each day's use. Since there is some normal leakage past the inner seal, 80, 82, the oil does need to be replenished periodically. When replenishment is indicated, oil is added through one of holes 36 and 39.

An alternate means of mounting and securing the hub cap to the hub is shown in FIG. 8. Instead of passages 29 and bolts 30, on the hub cap, and corresponding bolt holes 88 on the hub, a male threaded annulus 90 extends from the surface of wall 14 which faces the mounting surface 69 of hub 32. Threaded annulus 90 is screwed into a corresponding female threaded annulus 91 on hub 32, whereby the hub cap is mounted to the hub by turning the entire body of the hub cap to engage the corresponding threads. A compressible ring 92, such as a rubber O-ring provides an oil-tight seal between hub 32 and hub cap 10 at inner wall 14.

Thus the invention provides an improved hub cap which assists in sustaining the lubrication of especially the outer bearing at low oil levels.

The invention further provides a hub cap having an expanded reservoir adapted to retain oil and apply the oil to the outer bearing when the oil level is low.

The invention provides a hub cap which defines a secondary oil reservoir when the oil level is below the peripheral center-line of the securing locus.

Further, the invention provides a hub cap having pumping baffles adapted to urging oil toward the outer bearing.

The invention also provides a hub cap having filter means to trap and hold sediments in the oil.

The invention also provides a hub cap having magnet means to attract and hold magnetic particles and fragments in the oil.

Those skilled in the art will now see that certain modifications can be made to the articles, apparatus, and assemblies herein disclosed with respect to the illustrated embodiments, without departing from the spirit of the invention.

While the invention has been described above with respect to its preferred embodiments, it will be understood that the invention is capable of numerous rearrangements, modifications, and alterations, and all such arrangements, modifications, and alterations are intended to be within the scope of the appended claims.

Having thus described the invention, what is claimed is:

1. A hub cap for use with an oil-lubricated wheel hub, and wherein a hub with which said hub cap is to be associated contains bearings, and defines a primary oil reservoir for lubricating the bearings, said hub cap comprising:

(a) securing means, said securing means including a securing locus for securing said hub cap to a wheel hub, (b) an outer wall disposed away from said securing locus, (c) a peripheral connecting wall extending between said outer wall and said securing means, said hub cap thereby defining an inner space radially within said peripheral connecting wall, said inner space having a length along a longitudinal axis of said hub cap between said securing locus and said outer wall, portions of said connecting wall being disposed outwardly of said securing locus and way from said longitudinal axis along substantially the entire extent of said axis length, said securing locus comprising an inner wall adapted to face a wheel hub to which said hub cap is to be secured, and a plurality of closed bolt channels extending through said inner space and communicating with corresponding holes in said inner wall and said outer wall, whereby said hub cap defines a secondary oil reservoir, said secondary oil reservoir comprising said outer wall and said peripheral connecting wall, said secondary reservoir being large enough to contain sufficient oil to lubricate a bearing in the hub to which said hub cap is to be secured, until the next daily inspection.

2. A hub cap as in claim 1 wherein said outer wall, said peripheral connecting wall and said bolt channels comprise a plastic composition.

3. A hub cap as in claim 2 wherein all structural elements of said hub cap are plastic.

4. A hub, having a hub cap of claim 2 secured thereto with a plurality of bolts, and comprising an oil-tight securement.

5. A hub, having a hub cap of claim 3 secured thereto with a plurality of bolts, and comprising an oil-tight securement.

6. A hub cap for use with an oil-lubricated wheel hub, and wherein a hub with which said hub cap is to be associated contains bearings and defines a primary oil reservoir for lubricating the bearings, said hub cap comprising:
  (a) securing means, said securing means including a securing locus for securing said hub cap to a wheel hub,
  (b) an outer wall disposed away from said securing locus,
  (c) a peripheral connecting wall extending between said outer wall and said securing means,
  said hub cap thereby defining an inner space radially within said peripheral connecting wall,
  said inner space having a length along a longitudinal axis of said hub cap between said securing locus and said outer wall, portions of said connecting wall being disposed outwardly of said securing locus and away from said longitudinal axis along substantially the entire extent of said axis length,
  said securing means comprising a securing wall connected to said peripheral connecting wall and disposed inwardly thereof toward said longitudinal axis and adapted to face a wheel hub to which said hub cap is to be secured and to assist in forming an oil seal therewith, said securing locus being disposed inwardly toward said longitudinal axis from said peripheral connecting wall,
  said securing locus comprising a plurality of closed bolt channels extending through said inner space and communicating with corresponding holes in said securing wall and said outer wall,
  whereby said hub cap defines a secondary oil reservoir, said secondary oil reservoir comprising said outer wall and said peripheral connecting wall, said secondary reservoir being large enough to contain sufficient oil to lubricate a bearing in the hub to which said hub cap is to be secured, until the next daily inspection.

7. A hub cap as in claim 6 wherein said outer wall, said peripheral connecting wall and said bolt channels comprise a plastic composition.

8. A hub cap as in claim 7 wherein all structural elements of said hub cap are plastic.

9. A hub, having a hub cap of claim 8 secured thereto with a plurality of bolts, and comprising an oil-tight securement.

10. A hub, having a hub cap of claim 7 secured thereto with a plurality of bolts, and comprising an oil-tight securement.

11. A hub cap for use with an oil-lubricated wheel hub, and wherein a hub with which said hub cap is to be associated contains bearings and defines a primary oil reservoir for lubricating the bearings, said hub cap comprising:
  (a) securing means, said securing means including a securing locus for securing said hub cap to a wheel hub,
  (b) an outer wall disposed away from said securing locus,
  (c) a peripheral connecting wall extending between said outer wall and said securing means,
  said hub cap thereby defining an inner space radially within said peripheral connecting wall,
  said inner space having a length along a longitudinal axis of said hub cap between said securing locus and said outer wall, portions of said connecting wall being disposed outwardly of said securing locus and away from said longitudinal axis along substantially the entire extent of said axis length,
  said hub cap including a plurality of baffles spaced circumferentially about said peripheral connecting wall,
  whereby said hub cap defines a secondary oil reservoir, said secondary oil reservoir comprising said outer wall and said peripheral connecting wall, said secondary reservoir being large enough to contain sufficient oil to lubricate a bearing in the hub to which said hub cap is to be secured, until the next daily inspection.

12. A hub cap as in claim 11, said securing means comprising a securing wall adapted to interface with a hub, said hub cap including baffles defining opposing angles with respect to a plane passing through said longitudinal axis and said peripheral connecting wall, said baffles being adapted to urging oil toward said securing wall upon rotation of said hub cap in either direction about said longitudinal axis.

13. A hub cap as in claim 11, said securing means comprising a securing wall adapted to interface with a hub, said baffles extending from said securing wall to said outer wall.

14. A hub cap as in claim 11, said securing means comprising a securing wall adapted to interface with a hub, said baffles defining average angles, between said securing wall and said outer wall, of at least about 5 degrees with respect to a plane containing said longitudinal axis and passing through said peripheral connecting wall adjacent the respective one of said baffles.

15. A hub on a vehicle, having a hub cap of claim 14 secured thereto and wherein, when one said angle is defined with angle apex at said securing wall, said angle is disposed in the direction of rotation of said hub cap upon forward movement of the vehicle.

16. A hub cap as in claim 15, said hub cap comprising filter means secured in said inner space and adapted to trap sediments carried by the oil.

17. A hub cap for an oil-lubricated wheel hub, said hub cap comprising an inner wall for facing the hub, an outer wall disposed away from the hub, and a connecting wall between said inner and outer walls, said walls defining an inner space, said inner space having a length along a longitudinal axis thereof, and an outer boundary defined in a plane perpendicular to said longitudinal axis; and including a plurality of baffles spaced circumferentially about said outer boundary, said baffles defining average angles, between said inner and outer walls, of at least about 5° with respect to a plane passing through said longitudinal axis and said connecting wall adjacent the respective one of said baffles.

18. A hub on a vehicle, having a hub cap of claim 17 secured thereto and wherein, when one said angle is defined with angle apex at said inner wall, said angle is disposed in the direction of rotation of said hub cap upon forward movement of the vehicle.

19. A hub cap as in claim 17, and including baffles defining opposing angles with respect to a plane passing through said longitudinal axis and said connecting wall, and adapted to urging oil toward said inner wall upon rotation of said hub cap in either direction about said longitudinal axis.

20. A hub cap as in claim 19, said hub cap comprising filter means secured in said inner space and adapted to trap sediments carried by the oil.

21. A hub cap as in claim 19, said hub cap comprising magnet means adapted to attract and hold metal particles and fragments carried by the oil.

22. A hub cap as in claim 17, said hub cap comprising filter means secured in said inner space and adapted to trap sediments carried by the oil.

23. A hub cap as in claim 17, said hub cap comprising magnet means adapted to attract and hold metal particles and fragments carried by the oil.

24. A hub cap for an oil-lubricated wheel hub, sad hub cap having a longitudinal axis, and comprising:
   (a) an inner wall, said inner wall being adapted to form an interface with a hub;
   (b) an outer wall disposed away from said interface; and
   (c) a connecting wall between, and connecting, said inner and outer walls,
said inner wall extending inwardly from said connecting wall, toward said longitudinal axis, the combination of said inner wall, said outer wall and said connecting wall defining a secondary oil reservoir large enough to effectively lubricate a bearing on a temporary basis, said hub cap comprising a plurality of baffles spaced therein, about the circumference thereof, at said connecting wall.

25. A hub cap as in claim 24, said hub cap comprising filter means secured thereto in said inner space and adapted to trap sediments carried by the oil.

26. A hub cap as in claim 25, said hub cap comprising magnet means adapted to attract and hold metal particles and fragments carried by the oil.

27. A wheel hub assembly, said wheel hub assembly being adapted to be lubricated by oil, and having a longitudinal axis, said assembly comprising:
   (a) a wheel hub, said wheel hub comprising an inner hub space, said inner hub space being defined by walls thereabout, said inner hub space containing a bearing and comprising a primary oil reservoir, said inner hub space extending to an orifice of said hub, said hub comprising a mounting surface adapted to receive and interface with a hub cap, said mounting surface having an inner circumference at said orifice and an outer circumference; and
   (b) a hub cap secured to said wheel hub and interfacing with said wheel hub, said hub cap comprising:
      (i) an inner wall facing said mounting surface;
      (ii) an outer wall disposed away from said mounting surface;
      (iii) a peripheral connecting wall extending between and connecting said inner and outer walls; and
      (iv) an inner hub cap space defined by said inner wall, said outer wall, and said peripheral connecting wall, said inner space extending from said orifice outwardly away from said longitudinal axis to a circumference substantially corresponding to said outer circumference of said mounting surface of said wheel hub,
      (v) a plurality of baffles in said hub cap, said baffles being spaced circumferentially about said hub cap along said peripheral connecting wall,
   whereby said hub cap defines a secondary oil reservoir, said secondary oil reservoir comprising said inner and outer walls and said peripheral connecting wall, said secondary oil reservoir being sufficiently large to contain sufficient oil to lubricate said bearing until the next daily inspection.

28. A wheel hub assembly as in claim 27, and including baffles in said hub cap, said baffles defining opposing angles with respect to a plane passing through said longitudinal axis and said peripheral connecting wall, said baffles being adapted to urging oil toward said inner wall upon rotation of said wheel hub assembly in either direction about said longitudinal axis.

29. A wheel hub assembly as in claim 28, and comprising filter means secured to said hub cap in said inner hub cap space, and adapted to trap sediments carried by the oil.

30. A wheel hub assembly as in claim 27, and comprising filter means secured to said hub cap in said inner hub cap space, and adapted to trap sediments carried by the oil.

31. A wheel hub assembly as in claim 30, and comprising magnet means secured to said hub cap in said inner hub cap space, and adapted to attract and hold metal particles and fragments carried by the oil.

* * * * *